April 5, 1927.  1,623,607
J. WATKINS ET AL
SWING OPERATED FAN
Filed Aug. 27, 1923
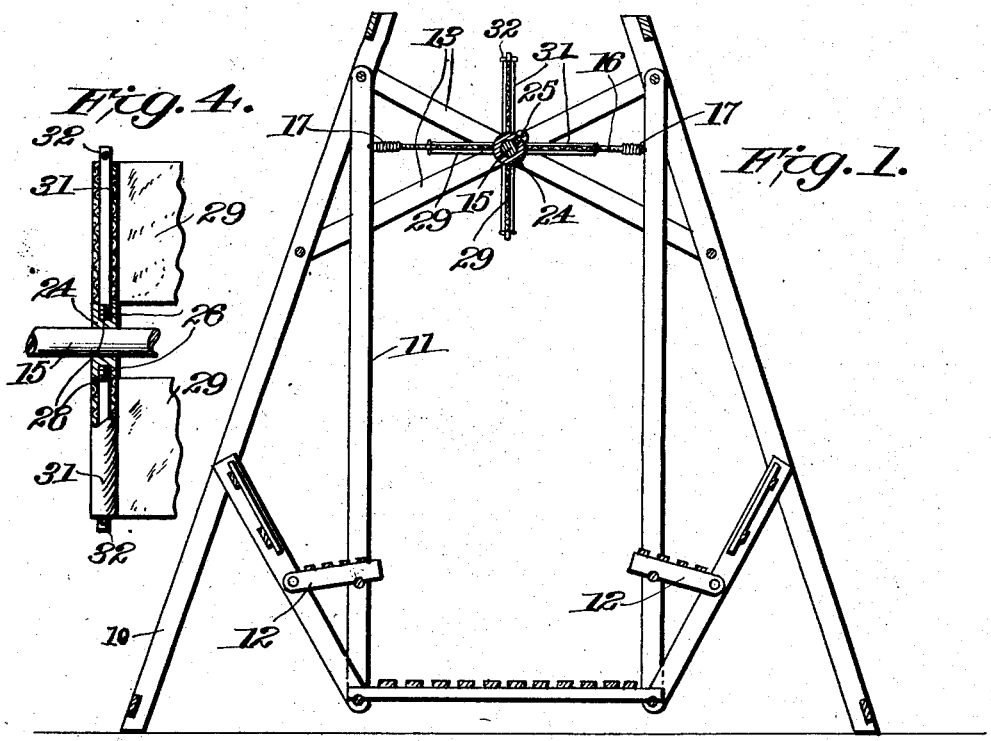
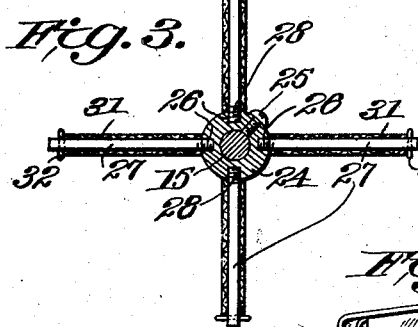
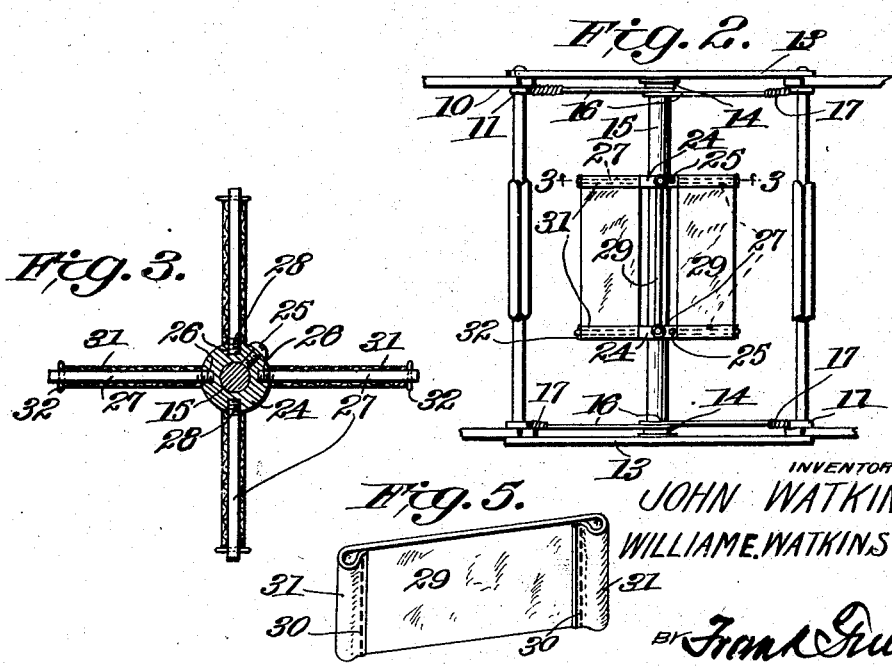
INVENTORS,
JOHN WATKINS AND
WILLIAM E. WATKINS,
BY Frank Fuller
ATTORNEY.

Patented Apr. 5, 1927.

1,623,607

UNITED STATES PATENT OFFICE.

JOHN WATKINS AND WILLIAM E. WATKINS, OF MILMAY, NEW JERSEY.

SWING-OPERATED FAN.

Application filed August 27, 1923. Serial No. 659,535.

This invention relates to a swing-operated fan.

It is aimed to improve and simplify the construction of device of this character disclosed in Letters Patent Number 1,436,553, issued to us on November 21, 1922, for an air agitating apparatus, to the end that it may be manufactured at a less cost and more expeditiously.

More specifically it is aimed to provide a simpler, more easily assembled and less expensive construction of fan shaft and means for securing the fan wings thereto.

Additional objects and advantages will become apparent from the description following taken in connection with accompanying drawings illustrating one operative embodiment.

In said drawings—

Figure 1 is a substantially central vertical view of a swing constructed in accordance with the present invention, Figure 2 is a plan view of the swing, partly broken away;

Figure 3 is a sectional view taken on the line 3—3 of Figure 2;

Figure 4 is a fragmentary view, partly in section, taken longitudinally of the fan to illustrate the connection of the wings to the fan shaft, and Figure 5 is a detail perspective view of one of the wings.

Like reference characters designate like or corresponding parts in the different views.

Referring specifically to the drawings, and as in said Patent 1,436,553, the swing comprises a frame 10, hangers 11 which are supported on said frame for oscillatory movement, and seats 12 carried by said hangers. Braces 13 form part of frame 10 and mount bearings 14 in which a shaft 15 is journalled for oscillatory movement. Shaft 15 is driven by means of belt 16 fastened to and wound preferably one time about the shaft 15 and fastened to tensile springs 17 in turn secured to hangers 11. Pulleys fastened to the shaft 15 to accommodate the belts 16 are unnecessary. The shaft 15, belts 16 and springs 17, correspond, respectively to the shaft 14, belts 22 and springs 23 in said patent. In this instance the belts and springs are preferably horizontally disposed.

In this device, shaft 15 may be in a single piece instead of sectional as in said patent. Slidably adjustable along shaft 15 are two collars 24 secured in place by set screws 25 carried thereby and adapted to bind against shaft 15. Said collars 24 are provided with any desired number of radial holes or openings 26, in which rods 27 are detachably screw threaded as at 28. The wings 29 in this instance are used instead of those at 18 in said patent. These wings may be of any suitable material usually textile sheets having their ends returned and stitched to the remainder at 30 in order to provide sleeves 31 which detachably slip onto the rods 27 and are secured against displacement from the rods in any desired manner and for example by detachable pins 32. As the wings are textile, they may be stretched or rendered sufficiently taut through the adjustment of the collars 24 along shaft 15.

The foregoing construction is exceedingly simple, and capable of manufacture and installation at extremely low cost and yet the same affords maximum efficiency in operation.

In operation, as seats 12 move back and forth the hangers 11 oscillate, which causes belts 16 to reversibly rotate the shaft 15 and accordingly the fan wings 29 in order to agitate the air or to produce fan action.

Changes may be resorted to within the spirit and scope of the invention.

We claim as our invention,

A fan device of the class described, in combination with a swing-driven shaft, collars on said shaft, rods radiating from said collars and removably secured thereto, fan wings of flexible material having sleeves at their ends applicable to said rods, means to prevent accidental detachment of the sleeves from the rods, said collars being adjustable on said shaft toward and away from each other, and means to secure the collars in adjusted positions rigidly to said shaft.

In testimony whereof we affix our signatures.

JOHN WATKINS.
WILLIAM E. WATKINS.